(12) United States Patent
Dellinger et al.

(10) Patent No.: US 8,171,687 B2
(45) Date of Patent: May 8, 2012

(54) WATER VAPOR BARRIER FOR A CONCRETE FLOORING SYSTEM

(75) Inventors: Allan Marcus Dellinger, Matthews, NC (US); Patrick H. Giles, Anoka, MN (US); Steven F. Nielsen, Charlotte, NC (US)

(73) Assignees: Dell SeVen, Inc., Matthews, NC (US); Maxxon Corporation, Hamel, MN (US); Southeast Nonwovens, Inc., Charlotte, NC (US)

( * ) Notice: Subject to any disclaimer, the term of this patent is extended or adjusted under 35 U.S.C. 154(b) by 494 days.

(21) Appl. No.: 12/410,100

(22) Filed: Mar. 24, 2009

(65) Prior Publication Data

US 2009/0241453 A1 Oct. 1, 2009

Related U.S. Application Data

(60) Provisional application No. 61/039,929, filed on Mar. 27, 2008.

(51) Int. Cl.
E04B 5/00 (2006.01)

(52) U.S. Cl. .......... 52/408; 52/309.8; 52/403.1; 52/411; 442/394; 442/398

(58) Field of Classification Search .......... 52/309.8, 52/408, 309.12, 302.1, 403.1, 411, 412, 413; 442/57, 381, 392, 394, 398
See application file for complete search history.

(56) References Cited

U.S. PATENT DOCUMENTS

| | | | | |
|---|---|---|---|---|
| 2,352,314 A * | 6/1944 | Fischer | 404/40 |
| 4,438,167 A * | 3/1984 | Schwarz | 428/138 |
| 4,522,203 A * | 6/1985 | Mays | 128/849 |
| 4,828,910 A * | 5/1989 | Haussling | 442/391 |
| 4,833,010 A * | 5/1989 | Langley | 442/396 |
| 5,151,314 A * | 9/1992 | Brown | 428/198 |
| 5,208,098 A * | 5/1993 | Stover | 442/398 |
| 5,308,692 A * | 5/1994 | Kennedy et al. | 442/327 |
| 5,422,172 A * | 6/1995 | Wu | 442/62 |
| 5,501,895 A * | 3/1996 | Finley et al. | 428/194 |
| 5,578,363 A * | 11/1996 | Finley et al. | 428/194 |
| 5,584,950 A * | 12/1996 | Gaffigan | 156/71 |
| 5,766,745 A * | 6/1998 | Smith et al. | 428/218 |
| 5,766,754 A * | 6/1998 | Fleck et al. | 428/323 |
| 5,767,024 A * | 6/1998 | Anderson et al. | 442/378 |
| 5,868,399 A * | 2/1999 | Schluter | 277/650 |
| 5,956,921 A * | 9/1999 | Fleck et al. | 52/741.3 |
| 6,077,613 A * | 6/2000 | Gaffigan | 428/442 |
| 6,093,485 A * | 7/2000 | Jaffee | 428/317.1 |
| 6,167,668 B1 * | 1/2001 | Fine et al. | 52/403.1 |
| 6,562,173 B1 * | 5/2003 | Collison et al. | 156/259 |
| 6,576,577 B1 * | 6/2003 | Garner | 442/374 |
| 6,629,340 B1 * | 10/2003 | Dale et al. | 28/104 |
| 6,676,779 B2 * | 1/2004 | Hopkins et al. | 156/71 |
| 6,893,752 B2 * | 5/2005 | Veeramasuneni et al. | 428/703 |
| 6,986,229 B2 * | 1/2006 | Collison et al. | 52/384 |
| 7,037,864 B2 * | 5/2006 | Faucher | 442/86 |
| 7,096,630 B1 | 8/2006 | Keene et al. | |
| 7,491,438 B2 * | 2/2009 | Demott et al. | 428/95 |
| 7,807,011 B2 * | 10/2010 | Dunstan et al. | 156/308.2 |

(Continued)

*Primary Examiner* — Robert Canfield
*Assistant Examiner* — Matthew Gitlin
(74) *Attorney, Agent, or Firm* — Hammer & Associates, P.C.

(57) ABSTRACT

A water vapor barrier material for a building structure includes a base entangled net material and a composite nonwoven. The composite nonwoven includes a film layer with a nonwoven layer on each side of the film layer. The film layer has a water vapor transmission rate of less than 10.0 g-MIL/100-in²/day at a temperature of 100 degrees Fahrenheit and 90 percent relative humidity.

18 Claims, 2 Drawing Sheets

U.S. PATENT DOCUMENTS

| | | | |
|---|---|---|---|
| 2002/0056500 A1* | 5/2002 | Collison et al. | 156/62.6 |
| 2003/0134557 A1* | 7/2003 | Collison et al. | 442/356 |
| 2003/0196762 A1* | 10/2003 | Collison et al. | 156/510 |
| 2004/0197544 A1* | 10/2004 | Ramesh et al. | 428/304.4 |
| 2005/0079314 A1* | 4/2005 | Brodeur et al. | 428/71 |
| 2005/0153612 A1* | 7/2005 | Suda et al. | 442/180 |
| 2006/0019563 A1* | 1/2006 | Rising | 442/88 |
| 2006/0019568 A1* | 1/2006 | Toas et al. | 442/381 |
| 2006/0032170 A1* | 2/2006 | Vershum et al. | 52/403.1 |
| 2006/0070326 A1* | 4/2006 | Collison et al. | 52/403.1 |
| 2006/0089073 A1* | 4/2006 | Sobieski | 442/394 |
| 2006/0106124 A1* | 5/2006 | Fink et al. | 521/172 |
| 2006/0141239 A1* | 6/2006 | Gilder | 428/318.6 |
| 2006/0144012 A1* | 7/2006 | Manning et al. | 52/782.1 |
| 2007/0004306 A1* | 1/2007 | Leeser et al. | 442/394 |
| 2007/0039268 A1* | 2/2007 | Ambrose et al. | 52/403.1 |
| 2007/0062139 A1* | 3/2007 | Jones et al. | 52/403.1 |
| 2007/0141930 A1* | 6/2007 | Thomas et al. | 442/59 |

* cited by examiner

WATER VAPOR BARRIER FOR A CONCRETE FLOORING SYSTEM

RELATED APPLICATION

This application claims the benefit of U.S. Provisional application Ser. No. 61/039,929 filed Mar. 27, 2008.

FIELD OF INVENTION

The instant application relates to a material and method for providing a water vapor barrier to a building structure, namely, a concrete flooring system.

BACKGROUND OF THE INVENTION

A water vapor barrier is a material that prevents all, or mostly all, of water or water vapor from penetrating through the material. This is commonly known as having a water vapor transmission rate of approximately zero. A water vapor barrier may be desirable in situations to prevent moisture from moving or penetrating from one area to the next.

Flooring in residential or commercial buildings can be made with concrete. Concrete is a construction material composed of cement, as well as other cementitious materials such as fly ash and slag cement, aggregate, water, and chemical admixtures. Concrete solidifies and hardens after mixing with water and placement due to a chemical process known as hydration. The water reacts with the cement, which bonds the other components together, eventually creating a stone-like material.

Combining water with a cementitious material forms a cement paste by the process of hydration. The cement paste glues the aggregate together, fills voids within it, and allows it to flow more easily. The more water that is added to the cement paste, the more of an easier-flowing concrete is provided with a higher slump. This is extremely desirable when pouring concrete floors in building structures. The more slump, or easier-flowing the concrete is, the easier it is to pour the concrete floors. Thus, most concrete floors are poured with a cement paste with a relatively high amount of water.

Hydration involves many different reactions, often occurring at the same time. As the reactions proceed, the products of the cement hydration process gradually bond together the individual sand and gravel particles, and other components of the concrete, to form a solid mass. However, because of the large amount of water typically used when pouring concrete floors, some of the water is not used in the reaction process and eventually falls to the bottom of the concrete via gravity. In addition, because of the hydration process and presence of water, a water vapor is typically present around the outside of the concrete material. This extra water and water vapor below the concrete floor is then either absorbed into the subflooring material or trapped in an airspace between the subflooring material and the concrete. Both of these situations are undesirable as they can lead to mold, mildew and rotting of the subflooring materials. As a result, it is desirable to prevent this extra water and water vapor from entering the subflooring material or the airspace between the subflooring and the concrete flooring.

In addition, hydration and hardening of concrete during the first three days is critical. Properly curing concrete leads to increased strength and lower permeability, and avoids cracking where the surface dries out prematurely. The early strength of the concrete can be increased by keeping it damp for a longer period during the curing process. During this period concrete needs to be in conditions with a controlled temperature and humid atmosphere. Thus, there is a need to keep the water and water vapor used in the cement paste of concrete structures from flowing or absorbing out from the bottom of the concrete floor as it is being cured.

The instant invention is designed to provide a water vapor barrier for a concrete flooring system that addresses all the problems mentioned above.

SUMMARY OF THE INVENTION

The instant invention includes a water vapor barrier for a building structure. The water vapor barrier includes a base entangled net material and a composite nonwoven. The composite nonwoven includes a film layer with a nonwoven layer on each side of the film layer. The film layer has a water vapor transmission rate of less than 10.0 g-MIL/100-in$^2$/day at a temperature of 100 degrees Fahrenheit and 90 percent relative humidity.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
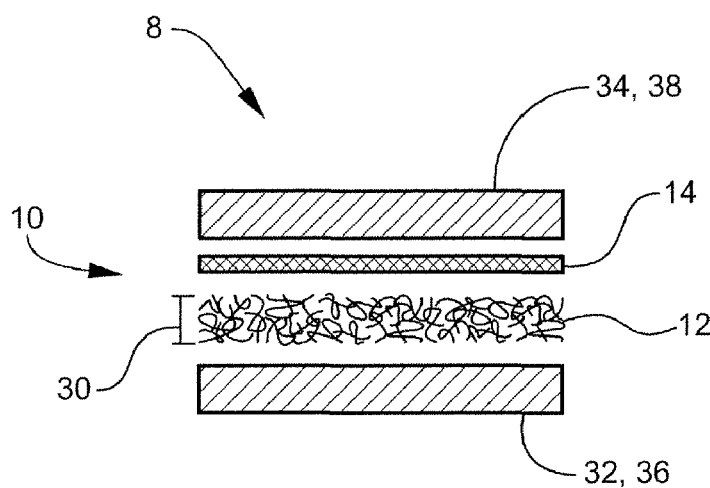
FIG. 1 is a cross-sectional view of one embodiment of a building structure with the water vapor material installed according to the instant invention.

Referring to the drawings, wherein like numerals indicate like elements, there is shown in FIG. 1 an embodiment of a building structure 8 including a water vapor barrier material 10 installed according to the instant invention. Building structure 8 can be any building structure, including, but not limited to, a floor, a wall, a roof, a ceiling, etc. For ease and consistency of this application, we may refer to building structure 8 as a concrete floor; however, the invention is not so limited.

Figure 2:
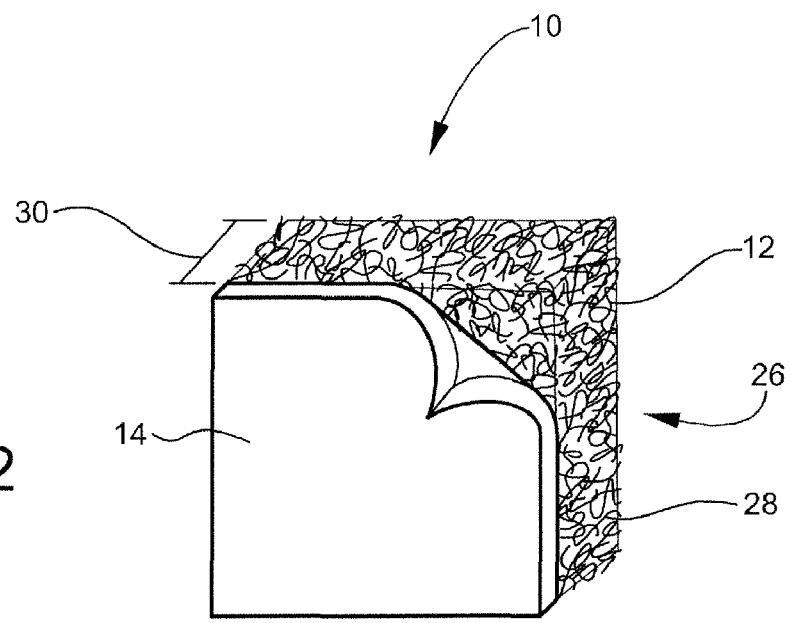
FIG. 2 is a perspective view of one embodiment of the water vapor material with the composite nonwoven partially rolled back.

Water vapor barrier material 10 may be included in building structure 8. See FIG. 1. Water vapor barrier material 10 may be for providing a water vapor barrier between a subflooring 36 and a flooring 38. Water vapor barrier material 10 may also be for providing an airspace between subflooring 36 and flooring 38. Water vapor barrier material 10 may include any known materials in the art. In one embodiment, water vapor material 10 may include a base entangled net material 12 and a composite nonwoven 14. See FIG. 2. In one embodiment of water vapor material 10, composite nonwoven 14 may be provided on one side of base entangled net material 12 and may be positioned adjacent to flooring 38 as shown in FIG. 1. However, in other embodiments of water vapor barrier material 10, composite nonwoven 14 may also be positioned on both sides of base entangled net material 12 or be positioned on the side adjacent subflooring 36. In one embodiment, water vapor barrier material 10 may be provided where base entangled net material 12 and composite nonwoven 14 are bonded together to form a mat like structure. In another embodiment, water vapor barrier material 10 may be provided where base entangled net material 12 and composite nonwoven 14 are provided and installed separately.

Base entangled net material 12 may be included in water vapor barrier material 10. See FIG. 2. Base entangled net material 12 may be for providing an air space within water vapor barrier material 10. Base entangled net material 12 may be any material for providing an air space within water vapor barrier material 10, including, but not limited to, any known entangled net materials. Base entangled net material 12 may include a thickness 30 for determining the depth of the air space within water vapor barrier material 10. Thickness 30 may be any thickness. In one embodiment, thickness 30 may be between 4 mm and 22 mm. In another embodiment, thickness 30 may be between 6 mm and 19 mm. Base entangled net material 12 may have any basis weight, including, but not limited to, an embodiment with a basis weight between 200 $g/m^2$ and 1100 $g/m^2$, an embodiment with a basis weight between 300 $g/m^2$ and 1000 $g/m^2$, and/or an embodiment with a basis weight between 400 $g/m^2$ and 900 $g/m^2$. Base entangled net material 12 may also have any compressive strength, including, but not limited to, a compressive load strength of greater than 30,000 psf as measured by ASTM 1621 modified and ASTM 4716 (failure defined as reaching yield point or no continued measurable flow under stated load). Base entangled net material 12 may be a randomly entangled net material or it may be a fixed entanglement net material. Base entangled net material 12 may be any shaped entangled net material, including, but not limited to, a saw tooth entangled net material, a pyramid shaped entangled net material, a cornrow shaped entangled net material, or any other shapes of entangled net material known in the art. Suitable entangled net structures are available commercially from Colbond, Inc. of Enka, N.C.

Base entangled net material 12 may be made out of any material. In one embodiment, base entangled net material 12 may be made out of a polymeric material 26. See FIG. 2. In this embodiment, polymeric material 26 may be melt fused together where a plurality of bonding points 28 may be distributed within base entangled net material 12. Polymeric material 26 may be any polymeric material, including, but not limited to, polypropylene, nylon 6, nylon 6.6, polyester, and any combinations thereof.

Composite nonwoven 14 may be included in water vapor barrier material 10. See FIG. 2. In one embodiment, composite nonwoven 14 may include two nonwoven layers 18 with a film layer 16 sandwiched in between. See FIG. 3. However, composite nonwoven 14 is not so limited. In other embodiments, composite nonwoven 14 may include just film layer 16 or a single nonwoven layer 18 on either side of film layer 16. Composite nonwoven 14 may be optionally attached or secured to one or both sides of base entangled net material 12. For example, composite nonwoven 14 may be thermally bonded to one or both sides of base entangled net material 12. Composite nonwoven 14 may have any physical properties. In one embodiment, composite nonwoven 14 may have a basis weight of 78 $g/m^2$, a puncture strength with a Mullen Burst of 100 psi as measured by ASTM D-774, an air permeability of less than 1 cfm, a MD Tensile strength of 15 lb/in as measured by ASTM D-828, a CD Tensile strength of 12 lb/in as measured by ASTM D-828, an MD Tear strength of 480 gf as measured by ASTM D-689, and/or a CD Tear strength of 720 gf as measured by ASTM D-689.

Film layer 16 may be included in composite nonwoven 14. See FIG. 3. Film layer 16 may be for providing composite nonwoven 14 with a water vapor transmission rate of approximately zero. Film layer 16 may be any film with a water vapor transmission rate of approximately zero. A water vapor transmission rate of approximately zero means that practically no water or water vapor may pass through composite nonwoven 14. In one embodiment, film layer 16 may have a water vapor transmission rate of less than 10.0 g-MIL/100-$in^2$/day (g-MIL is equal to grams per $\frac{1}{1000}$ of an inch in thickness) at a temperature of 100 degrees Fahrenheit and 90 percent relative humidity. In one embodiment, film layer 16 may have a water vapor transmission rate of less than 5.0 g-MIL/100-$in^2$/day at a temperature of 100 degrees Fahrenheit and 90 percent relative humidity. In one embodiment, film layer 16 may have a water vapor transmission rate of less than 2.0 g-MIL/100-$in^2$/day at a temperature of 100 degrees Fahrenheit and 90 relative humidity. In one embodiment, film layer 16 may have a water vapor transmission rate of 1.2 g-MIL/100-$in^2$/day at a temperature of 100 degrees Fahrenheit and 90 percent relative humidity. Film layer 16 may be made out of any material, including, but not limited to, polyethylene. In one embodiment, film layer 16 may be a low density polyethylene (LDPE).

Figure 3:
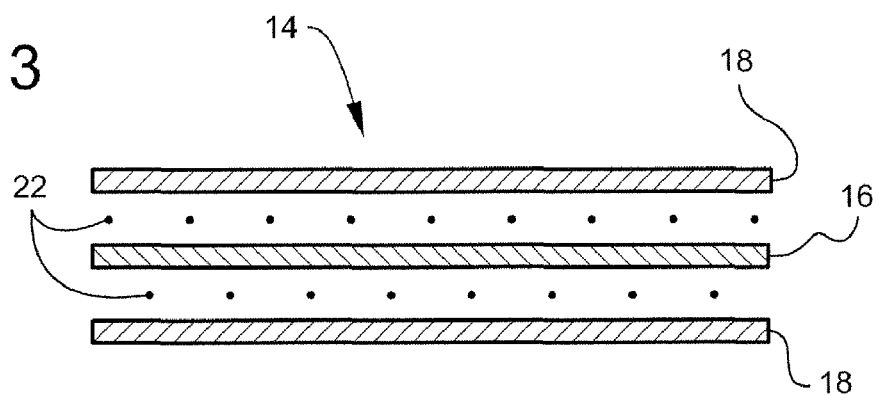
FIG. 3 is a cross-sectional view of one embodiment of the composite nonwoven material according to the instant invention.

One or more nonwoven layers 18 may be included in composite nonwoven 14. Each nonwoven layer 18 may be for protecting film layer 16. See FIG. 3. Each nonwoven layer 18 may be any nonwoven for protecting film layer 16. In one embodiment, as shown in FIG. 3, two nonwoven layers 18 may be provided on both sides of film layer 16. However, in other embodiments, nonwoven layer 18 may be provided on either side of film layer 16. Each nonwoven layer 18 may be any type of nonwoven. In one embodiment, each nonwoven layer 18 may be a spunbonded nonwoven. Each nonwoven layer 18 may have any basis weight. In one embodiment, each nonwoven layer 18 may have a basis weight between 20 $g/m^2$ and 40 $g/m^2$. In another embodiment, each nonwoven layer 18 may have a basis weight between 25 $g/m^2$ and 35 $g/m^2$. In one embodiment, each nonwoven layer 18 of composite nonwoven 14 may be identical nonwovens. In another embodiment, the nonwoven layers 18 of composite nonwoven 14 may be different nonwovens.

Nonwoven layers 18 may be attached to film layer 16 by any means. As shown in FIG. 3, in one embodiment of composite nonwoven 14, each nonwoven layer 18 may be attached to film layer 16 by a plurality of point bonds 22 (point bonds are also known as spot bonds). Point bonds 22 may be any point bonds, including, but not limited to, thermal point bonds. Point bonds 22 determine the land area of composite nonwoven 14, i.e., the total bonded area of composite nonwoven 14 is the land area. There may be any number and size of point bonds 22 to form the land area of composite nonwoven 14. In one embodiment, point bonds 22 may provide a land area of 2% to 50% of the total area of composite nonwoven 14. In another embodiment, point bonds 22 may provide a land area of 5% to 30% of the total area of composite nonwoven 14. In yet another embodiment, point bonds 22 may provide a land area of 10% to 15% of the total area of composite nonwoven 14.

Water vapor barrier material 10 may be included in a building structure 8 to provide a water vapor barrier and airspace between building structure 8. See FIG. 1. Building structure 8 can be any building structure, including, but not limited to, a floor, a wall, a roof, a ceiling, etc. For ease and consistency of this application, we may refer to building structure 8 as a concrete floor, however, the invention is not so limited. Building structure 8 may include an inner structure 32, an outer structure 34, and water vapor barrier material 10 installed between inner structure 32 and outer structure 34.

Inner structure 32 may be included in building structure 8. Inner structure 32 may be any inner structure of a building.

For example, when building structure 8 may be a floor, inner structure 32 may be a subflooring 36. See FIG. 1. However, inner structure 32 may also be the inner structure of a wall, ceiling, roof, etc. As another example, in a roof, inner structure 32 may be the inner sheathing of the roof, like the plywood under the shingles.

Outer structure 34 may be included in building structure 8. Outer structure 34 may be any outer structure of a building. For example, when building structure 8 may be a floor, outer structure 34 may be a flooring 38. See FIG. 1. However, outer structure 34 may also be the outer structure of a wall, ceiling, roof, etc. As another example, in a roof, outer structure 34 may be the outer sheathing of the roof, like shingles. In one embodiment, outer structure 34 may be any type of flooring 38, including, but not limited to, a hardwood flooring, a soft-wood flooring, a tile, a hardenable material, a carpet, a gypsum topping, a light-weight concrete, a cementitious self leveling material, a mortar bed, a thin-set, a concrete topping, and any combinations thereof. Because of the extra water and water vapor produced from cementitious type flooring, water vapor barrier material 10 may be most useful when flooring 38 may be a gypsum topping, a light-weight concrete, a cementitious self leveling material, a mortar bed, a thin-set, a concrete topping, and/or any combinations thereof.

Building structure 8 may also include a crack suppression entangled net material. The crack suppression entangled net material may be for providing building structure 8, namely a floor, with a crack suppression resistance. The crack suppression entangled net material may provide any amount of crack suppression resistance. This crack suppression resistance may prevent or greatly reduce cracking of flooring 38. For example, the crack suppression entangled net material may prevent or greatly reduce cracking in a gypsum topping, a light-weight concrete, a cementitious self leveling material, a mortar bed, a thin-set, and/or a concrete topping. The crack suppression entangled net material may be oriented in any direction. For an optimal crack suppression resistance, the crack suppression entangled net material may be oriented at a ninety degree angle to base entangled net material 12. For example, if the two entangled net materials are corn row type entangled net materials, in one of the entangled net materials the cornrows would run in one direction, and in the other entangled net material, the corn rows would run in the other direction, i.e, at a ninety degree angle. The crack suppression entangled net material may also be for providing additional air space in between inner structure 32 and outer structure 34. The crack suppression entangled net material may be anywhere between inner structure 32 and outer structure 34, including, but not limited to, between water vapor barrier material 10 and inner structure 32 or between water vapor barrier material 10 and outer structure 34.

Figure 4:
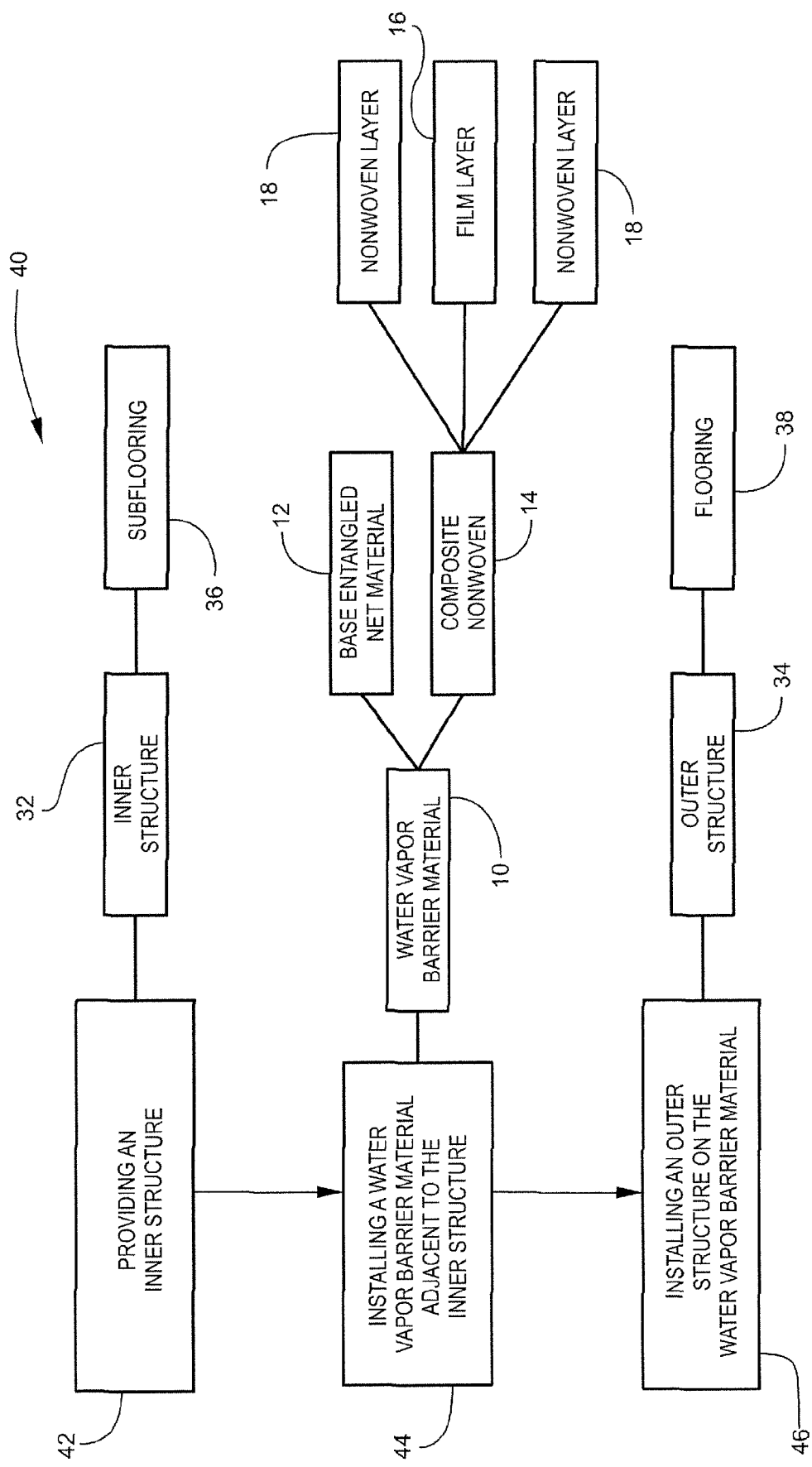
FIG. 4 is a diagram of one embodiment of the method of installing a water vapor barrier in a building structure according to the instant invention.

Referring to FIG. 4, a method 40 of installing a water vapor barrier in a building structure 8 is shown. Method 40 may include any steps for installing a water vapor barrier in building structure 8. Method 40 may include the following steps: a step 42 of providing inner structure 32; a step 44 of installing water vapor barrier material 10 adjacent to inner structure 32; and a step 46 of installing outer structure 34 on water vapor barrier material 10. In one embodiment, another step of installing a crack suppression entangled net material between inner structure 32 and outer structure 34 may also be included in method 40.

Step 42 of providing inner structure 32 may be included in method 40 of installing a water vapor barrier in a building structure 8. See FIG. 4. Step 42 may include any steps for providing inner structure 32. Step 42 may include providing any type of inner structure 32. In one embodiment, step 42 may include providing subflooring 36. In other embodiments, step 42 may include providing any inner structure for a floor, wall, roof, ceiling, etc.

Step 44 of installing water vapor barrier material 10 adjacent to inner structure 32 may be included in method 40 of installing a water vapor barrier in a building structure 8. See FIG. 4. Step 44 may include any steps for installing water vapor barrier material 10 adjacent to inner structure 32. In one embodiment, step 44 may include installing the base entangled net material 12 of water vapor barrier material 10 adjacent to inner structure 32 (see FIG. 1). Step 44 may include installing water vapor material 10 with base entangled net material 12 and composite nonwoven 14 attached together as a mat. Alternatively, step 44 may include installing water vapor barrier material 10 with base entangled net material 12 and composite nonwoven 14 not attached, where each material is installed separately.

Step 46 of installing outer structure 34 on water vapor barrier material 10 may be included in method 40 of installing a water vapor barrier in a building structure 8. See FIG. 4. Step 46 may include any steps for installing outer structure 34. Step 46 may include installing any type of outer structure 34. In one embodiment, step 46 may include installing flooring 38, including, but not limited to, installing a hardwood flooring, a soft-wood flooring, a tile, a hardenable material, a carpet, a gypsum topping, a light-weight concrete, a cementitious self leveling material, a mortar bed, a thin-set, a concrete topping, and any combinations thereof. In other embodiments, step 46 may include installing any outer structure for a floor, wall, roof, ceiling, etc.

Another step of installing a crack suppression entangled net material between inner structure 32 and outer structure 34 may optionally be included in method 40 of installing a water vapor barrier in a building structure 8. This step may include any steps for installing the crack suppression entangled net material between inner structure 32 and outer structure 34.

The instant invention may be embodied in other forms without departing from the spirit and the essential attributes thereof, and, accordingly, reference should be made to the appended claims, rather than to the foregoing specification, as indicated in the scope of the invention.

We claim:

1. A water vapor barrier material for a building structure comprising:
   a base entangled net material; and
   a composite nonwoven;
   said composite nonwoven including a film layer with a nonwoven layer on each side of said film layer;
   said film layer having a water vapor transmission rate of less than 10.0 g-MIL/100-in$^2$/day at a temperature of 100 degrees Fahrenheit and 90 percent relative humidity.

2. The water vapor barrier material for a building structure of claim 1 where said film layer having a water vapor transmission rate of less than 5.0 g-MIL/100-in$^2$/day at a temperature of 100 degrees Fahrenheit and 90 percent relative humidity.

3. The water vapor barrier material for a building structure of claim 1 where said film layer having a water vapor transmission rate of less than 2.0 g-MIL/100-in$^2$/day at a temperature of 100 degrees Fahrenheit and 90 percent relative humidity.

4. The water vapor barrier material for a building structure of claim 1 where each of said nonwoven layers being attached to said film layer by a plurality of point bonds.

5. The water vapor barrier material for a building structure of claim 4 where said point bonds having a land area of 2-50%.

6. The water vapor barrier material for a building structure of claim 5 where said land area being between 5-30%.

7. The water vapor barrier material for a building structure of claim 5 where said land area being between 10-15%.

8. The water vapor barrier material for a building structure of claim 1 where said nonwoven layers being spunbonded nonwoven layers.

9. The water vapor barrier material for a building structure of claim 1 where said nonwoven layers having a basis weight of between 20 g/m$^2$ and 40 g/m$^2$.

10. The water vapor barrier material for a building structure of claim 1 where said nonwoven layers having a basis weight of between 25 g/m$^2$ and 35 g/m$^2$.

11. The water vapor barrier material for a building structure of claim 1 where said base entangled net material comprising:
    a polymeric material being melt fused together where a plurality of bonding points being distributed within said base entangled net material.

12. The water vapor barrier material for a building structure of claim 1 where said base entangled net material having a thickness being between 4 mm and 22 mm.

13. The water vapor barrier material for a building structure of claim 1 where said base entangled net material having a thickness being between 6 mm and 19 mm.

14. The water vapor barrier material for a building structure of claim 1 where said base entangled net material having a compressive load strength greater than 30,000 psf.

15. A building structure with a water vapor barrier comprising:
    an inner structure;
    an outer structure; and
    a water vapor barrier material between said inner structure and said outer structure comprising:
        a base entangled net material; and
        a composite nonwoven;
        said composite nonwoven including a film layer with a nonwoven layer on each side of said film layer;
        said film layer having a water vapor transmission rate of less than 10.0 g-MIL/100-in$^2$/day at a temperature of 100 degrees Fahrenheit and 90 percent relative humidity.

16. The building structure with a water vapor barrier of claim 15 where said inner structure being a subflooring and said outer structure being a flooring.

17. The building structure with a water vapor barrier of claim 16 where said flooring being selected from the group consisting of: a hardwood flooring; a soft-wood flooring; a tile; a hardenable material; a carpet; a gypsum topping; a light-weight concrete; a cementitious self leveling material; a mortar bed; a thin-set; a concrete topping; and combinations thereof.

18. The building structure with a water vapor barrier of claim 16 where said flooring being selected from the group consisting of: a gypsum topping; a light-weight concrete; a cementitious self leveling material; a mortar bed; a thin-set; a concrete topping; and combinations thereof.

* * * * *